April 6, 1954
F. C. MATTESON ET AL
2,674,494
SHEAR NOZZLE FOR SPRAYING AND DUSTING APPARATUS
Filed Feb. 21, 1950
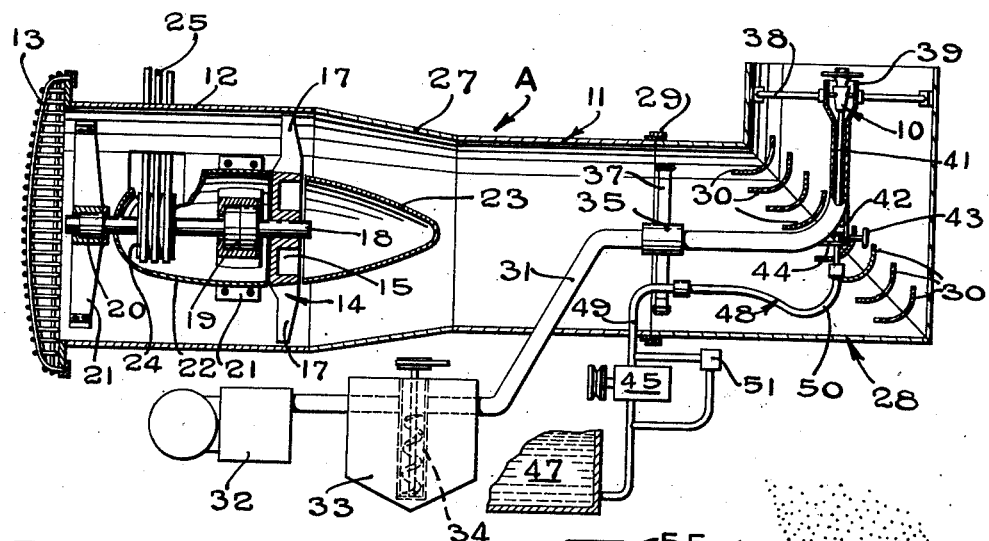
FIG_1
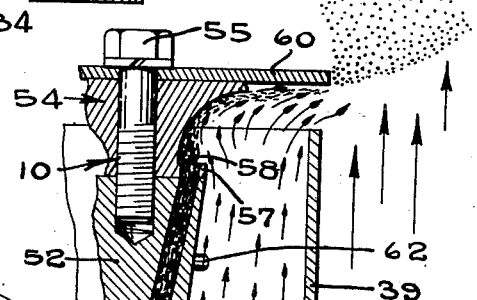
FIG_2
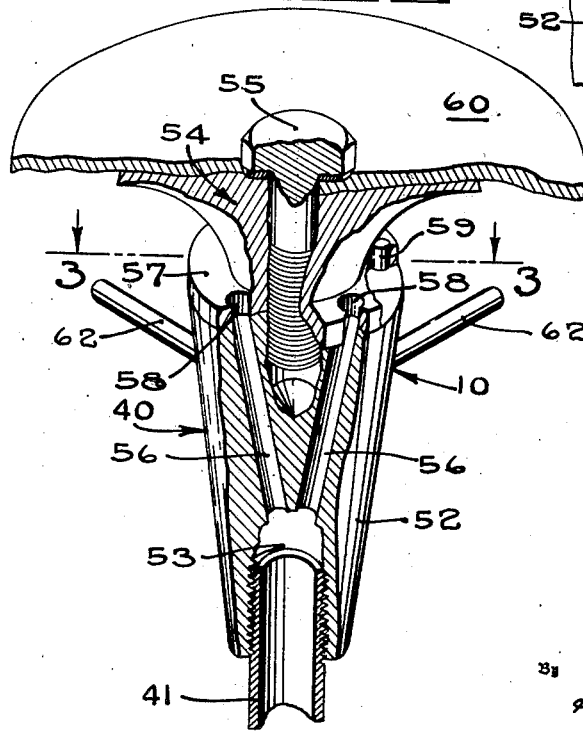
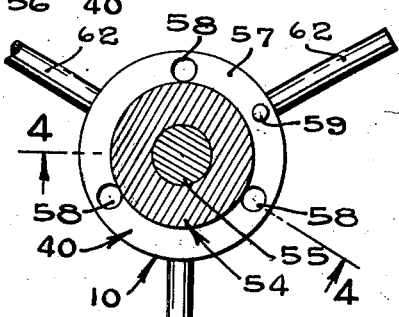
FIG_4
FIG_3
Inventors
FRANKLYN C. MATTESON
JOSEPH M. PATTERSON
Hans G. Hoffmeister.
Attorney Patented Apr. 6, 1954

2,674,494

UNITED STATES PATENT OFFICE 2,674,494

SHEAR NOZZLE FOR SPRAYING AND DUSTING APPARATUS

Franklyn C. Matteson, Wethersfield, Conn., and Joseph M. Patterson, Lansing, Mich., assignors to Food Machinery and Chemical Corporation, San Jose, Calif., a corporation of Delaware Application February 21, 1950, Serial No. 145,532

7 Claims. (Cl. 299—121)

The present invention relates to spraying, and is directed more particularly to a shear nozzle arrangement for use in the creation, and the air borne movement, of spray particles.

An object of the present invention is to provide an improved shear nozzle arrangement for agricultural use.

Another object is to mount a shear nozzle in a high velocity air stream which in turn is located within a main air blast of slower velocity so as to create spray particles of uniform size and to diffuse them throughout the main air blast.

Another object is to provide a shear nozzle wherein spray liquid is directed in jet form toward, and is spread in the form of a film across, a diverging surface toward an edge where the film is subjected to the shearing force of a high velocity air stream.

Another object is to create spray particles of uniform size by directing a jet of spray liquid substantially tangentially against a curved surface to spread the liquid in a film thereover, and to direct a high speed air stream across an edge of the surface toward which the liquid film tends to flow under the impulse of the jet to shear the liquid off the edge in the form of droplets of substantially uniform size.

Another object is to mount a shear nozzle comprising an outwardly flaring curved surface with a disk like end portion within a duct having a high velocity air stream flowing therethrough, with the disk spaced slightly endwise beyond the duct and a jet of liquid directed substantially tangentially against the curved flaring surface, and toward the disk, to cause the liquid to flow in a film across the curved surface toward a shearing peripheral edge of the disk where the liquid is sheared off in uniform droplets by the air stream.

Another object is to provide a shear nozzle wherein a plurality of jets of spraying fluid are shielded from initial contact with a high velocity stream of gas in which they are mounted and are directed against a flaring film forming surface and toward a shearing edge mounted transversely in the high velocity gas stream.

These and other objects and advantages of the present invention will become apparent from the following description and the accompanying drawings, wherein:

Fig. 1 is a diagrammatic view in the nature of a vertical longitudinal section of a spraying and dusting machine having a spray nozzle arrangement embodying the present invention mounted therein.

2

Fig. 2 is an enlarged perspective view of the inner portion of the spray nozzle shown in Fig. 1, portions being broken away to show liquid conducting passages therein.

Fig. 3 is a section taken on the line 3—3 of Fig. 2.

Fig. 4 is a fragmentary section taken as along the line 4—4 of Fig. 3 showing the nozzle structure of Figs. 2 and 3 as it would appear mounted in the discharge end of a duct for discharging a high velocity air blast into a larger and slower moving air blast.

In the illustrated form of the invention a shear nozzle 10 is shown diagrammatically in Fig. 1 as it would appear when mounted in one well known form of spraying and dusting machine A capable of creating air blast conditions suitable for practicing the invention. The illustrated air blast creating mechanism comprises a relatively large diameter passage or tunnel 11 of sheet metal, adapted to be mounted on a motor propelled vehicle or trailer of a usual type, not shown. The tunnel 11 has an inlet end portion 12 the entrance to which is covered by a usual protective grille 13.

An axial flow propeller 14 is mounted in a large diameter inlet end portion 12 of the tunnel 11. The propeller 14 has a disk-like imperforate hub portion 15 and radial blades 17, and is secured to a drive shaft 18 journaled in ball bearings 19 and 20 supported from the wall of the tunnel by brackets 21. A streamlined shield 22, co-extensive with the propeller hub 15, and extending upstream from the propeller, is secured to the brackets 21, while a streamlined cone or spinner 23, also co-extensive with the hub 15, is mounted to extend downstream from the propeller. A multiple V-groove drive pulley 24 is secured to the propeller shaft 18 and is adapted to be driven from a suitable source of power, such as an internal combustion engine, not shown, through V-belts 25, which pass through openings provided therefor in the shield 22 and in the tunnel wall.

The tunnel 11 is reduced in diameter somewhat at 27, and a 90° elbow 28 is mounted to swivel on the discharge end of said tunnel on a bearing ring 29. A plurality of usual air turning vanes 30 are provided at the turn of the elbow 28 to assist in changing the direction of the main air blast therethrough. A suitable discharge velocity for the main air blast from the elbow 28 is of the order of 90 miles per hour, but may be varied by changing the pitch or speed of rotation of the propeller 14 in a usual manner to provide a blast velocity suitable for each particular spraying or dusting application to be made.

It will be understood of course that the foregoing description of a main air blast creating mechanism is illustrative only of a suitable mounting for the present invention, and that any suitable mechanism capable of creating and discharging a directed air blast of suitable volume and velocity may be employed. Also that the term "air" as used herein also includes other gases which obviously could be used instead of air for practicing the invention.

A duct 31 for conveying insecticidal dust when required, and in any event to provide a high velocity air blast for cooperation with the shear nozzle which comprises a feature of the present invention, is mounted so as to discharge substantially centrally of the main blast as it issues from the elbow 28. An air pump or blower 32 is mounted to generate a high velocity air blast through the duct 31, a suitable discharge velocity for the air blast issuing from the duct 31 being of the order of 165 miles per hour. A dust hopper 33, for holding insecticidal or other dust, is provided with a usual dust feeder 34 to feed dust from the hopper 33 into the duct 31 at a controlled rate.

The duct 31 has a substantially air tight swivel type joint 35 therein to permit the portion of the duct within the tunnel elbow 28 to swivel freely therewith. Two sets of braces 37 and 38 extend radially from the swivel joint 35, and from the outer or discharge end of the duct 31, respectively, to the wall of the tunnel elbow 28 to support the duct in position substantially centrally therein. The discharge end portion 39 of the duct 31 is of slightly larger diameter than the remainder thereof to receive a shear nozzle core structure 40 therein.

The shear nozzle core structure 40 is secured for endwise adjustment in the enlarged outlet end portion 39 of the duct by being mounted on a combined rigid support and liquid supply tube 41, which is inserted through a substantially airtight slip-joint connection 42 into the duct 31 to extend coaxially within the terminal portion of the duct. The tube 41 is secured in endwise adjusted position in the duct by a set screw 43 screwed into a threaded hole in a bracket 44 welded onto a side of the duct 31. A liquid pressure pump 45 supplies liquid from a usual supply 47 thereof to the nozzle through a liquid supply line 48, comprising a pipe 49, a length of flexible hydraulic hose 50, and the nozzle support tube 41. The pressure through this line is controlled by a usual spring loaded by-pass type pressure regulator 51.

The shear nozzle core structure 40 comprises a base portion 52 of inverted, truncated, conical shape, with a threaded socket 53 axially of its truncated lower end. Into this socket is screwed the threaded upper end of the support and liquid supply tube 41. Three radially projecting positioning rods 62, secured to the conical base portion 52, have slidable endwise abutting engagement with the wall of the enlarged end portion 39 of the duct 31 to center the nozzle core structure 40 therein. Three symmetrically spaced axially inclined passages 56 open from the upper end of the threaded socket 53 in the lower end of the base portion 52, through the upper end of the base portion to provide passages for liquid spray material.

An upper liquid spreading and deflecting head and shear disk support portion 54 is secured, co-axially, upon the upper end of the conical base portion 52 (Fig. 2) by a bolt 55. The bolt passes through an axial hole through the upper head portion 54 and is screwed into a threaded axial hole in the upper end of the conical base member 52.

A radially extending flange 57 surrounds the lower end of the head portion 54 and is provided with three jet discharging orifices 58 therein. These orifices are either the same diameter as, or smaller than, the inclined passages 56 with which they are adapted to register, and their size regulates the amount of liquid discharged therethrough at a predetermined pressure. A positioning pin 59 is mounted in a hole in the upper end of the base member 52, and is adapted to enter a hole in the flange 57 to hold the head portion 54 in angularly adjusted relation to the base portion 52, with the orifices 58 in the flange 57 in register with the passages 56 in the base.

The upper portion of the head portion 54 above the flange 57 flares outwardly in a curved formation of circular cross sectional shape. The discharge orifices 58 in the flange 57 are offset radially outwardly a slight distance from the outwardly flaring side walls of the head portion. Therefore jets of liquid discharged upwardly through the orifices 58 strike the curved outwardly flaring surface of the head portion 54 at a very slight angle thereto. These jets are protected by the flange 57 from the surrounding high velocity air stream in the duct 31, which otherwise would tend to shear off droplets of irregular size from the jets themselves. The impact of the jets of liquid against the curved surface of the head 54 tends to spread the jet liquid out in a film over the curved flaring surface of the head, the film being urged by the force of the jets toward the upper outer edge of the head portion. The high speed air blast flowing between the duct wall and the nozzle core structure 40 strikes the outwardly flaring head surface beyond the flange 57 and thereby assists in the even spreading and outward flow of the film of liquid.

A stiff shear disk 60 (Fig. 2), preferably of somewhat larger diameter than the upper end of the nozzle head portion 54, is gripped between the upper end of said head portion and the head of the bolt 55. The diameter of the disk preferably is slightly greater than that of the discharge end of the high velocity air duct 31.

The flaring head portion 54 and disk 60 tend to divert the high velocity air stream from the duct 31 angularly outwardly into the main air blast being discharged from the elbow 28. This action disseminates the spray and dust particles throughout the main air blast but without adversely affecting the discharge of the main air blast toward the foliage or other destined target.

*Operation*

In using the spray mechanism of the present invention, several variables affect the characteristics of the spray or dust laden main air blast discharged from the elbow 28. These variables, all of which may be readily controlled or adjusted by the operator, include the rate at which dust is fed into the duct 31, the rate at which spray liquid is fed into the blast by the shear nozzle 10, and the spacing of the shear disc 60 from the discharge end of the duct 31. Also to be considered are the discharge velocities of the main air blast from the elbow 28 and of the high velocity air blast from the duct 31.

The rate at which dust is introduced into the duct 31 may be controlled in a usual manner by adjusting the feeding rate of the dust feeding mechanism 34. The liquid flow rate to the nozzle 10 is controlled by adjusting the liquid pressure in the line 48, and by the size of the orifices 58 in the radial flange 57 of the nozzle head portion 54. Adjustment of the nozzle core structure 40 axially of the duct 31 to vary the space between the disc 60 and the duct 31 may be accomplished, preferably with the operative parts of the spraying mechanism at rest, by loosening the set screw 43, moving the nozzle core assembly 40 to position the disk 60 at a desired distance from the discharge end of the duct 31, and then re-tightening the set screw.

A uniform spray particle size is very desirable in agricultural spray applications, since if the size of the particles in the spray varies from the optimum for the conditions existing in the field, as they do with many types of spray nozzles, the smaller than optimum spray particles or droplets may be wafted away or may evaporate quickly, while the larger ones tend to produce wasteful run-off. The size of the droplets distributed by the device of the present invention is not only uniform but can be changed to meet the conditions present in the field. Such a change in the droplet size may be quickly and conveniently accomplished by altering the spacing of the shear disc 60 from the end of the duct 31.

For example, with a discharge velocity of 90 miles per hour for the main air blast from the tunnel elbow 28, a discharge velocity of 165 miles per hour for the air blast from the duct 31, a pressure of 30 pounds per square inch on liquid spray material in the line 48, said liquid having a viscosity substantially equal to that of water, with three discharge orifices 58, each having a diameter of approximately one-eighth of an inch, and with the nozzle support and liquid supply tube 41 adjusted to position the disk 60 one quarter of an inch axially beyond the end of the enlarged portion 39 of the duct 31, it has been found that the size of a majority of the spray particles discharged is approximately 50 microns, and that the rate of liquid discharge is approximately 20 pints per minute. Increasing the endwise separation of the disk 60 from the end of the duct to ½ inch, the other conditions remaining the same, increases the size of the spray particles to 78 microns, while a further increase of this distance to three-quarters of an inch again decreases the particle size to 67 microns. Slight decreases in liquid pressure at each of these settings were found to decrease slightly the size of the particles, and also, of course, to decrease the amount of spray liquid discharged.

The high velocity air flow across the flaring surfaces of the nozzle head 54 and past the peripheral edge of the disk 60 assists in carrying the film of spraying liquid up along the flaring sides of the upper head portion 54 and thence to the marginal edge of the shear disk 60. There the high velocity air stream has a sharp shearing action on the film of liquid as it reaches the edge of the disk, which has been found to result in the shearing off of spray particles of high uniform size. The high speed ejection of the spray and dust particles by the high velocity blast from the duct 31 past the disk 60 and thence into the large volume main air blast passing through the elbow 28 creates a turbulence which causes a thorough and uniform dissemination of the spray and dust particles throughout the main air blast without adversely affecting its discharge velocity. The turbulence thus created within the main air blast also assists in carrying the air borne spray and dust particles to all sides of the leaves and branches of the sprayed agricultural products.

While we have described a preferred embodiment of the invention and have limited the description to a spray mechanism which is particularly adapted for the spraying of vegetable products, it will be understood, however, that various changes and modifications may be made in the details thereof without departing from the spirit and scope of the appended claims.

Having thus described the invention, what we claim as new and desire to protect by Letters Patent is as follows:

1. In a spray mechanism having main air blast forming and discharging means, a duct mounted centrally of the discharge end thereof, and means for discharging an air blast of substantially higher velocity than that of the main blast through said duct in the direction of the main blast; a spray nozzle core structure comprising a combined support and liquid supply tube mounted for endwise adjustment coaxially within the terminal portion of the duct, a nozzle base member supported on said tube, a nozzle head member having an annular flange thereon supported on said base member, said base member and said flange having continuous passages therethrough opening from the tube through the flange, said head member having an outwardly flaring liquid spreading surface beyond said flange from said base member, the axes of the passages through said base member being directed at a slight angle to the center axis of the base member toward the liquid spreading surface of said head member, a shear disk of stiff material and of larger diameter than the head member mounted transversely upon the head member with the edge of the disk spaced endwise beyond the duct, and means for supplying liquid under pressure to the tube and thence through the passages for impingement of said liquid at a slight angle against the liquid spreading surface of the head member to spread said liquid thereover toward the disk.

2. In a spray mechanism having main air blast forming and discharging means, a duct mounted within the discharge end thereof, and means for discharging an air blast of substantially higher velocity than that of the main blast through said duct in the direction of the main blast; a spray nozzle core structure comprising a combined support and liquid supply tube mounted for endwise adjustment co-axially within the terminal portion of the duct, a nozzle base member supported on said tube, guide means extending between the base member and the duct, a nozzle head member supported on said base member, said base member and said head member having continuous passages therethrough opening from the tube and outwardly through a portion of the head member shielded from air blast, a shear disk of stiff material mounted transversely upon the head member with the edge of the disk spaced endwise beyond the duct and exposed to air blast therefrom, and means for supplying liquid under pressure to the tube and thence through the passages for impingement against the head member.

3. A shear nozzle comprising a duct having a high velocity air stream discharging therefrom, a core member having one or more apertures and mounted within and axially of said duct in spaced relation to the inner wall surface thereof, said core member having a concavely curved wall surface thereon for impingement by the air stream, a disk member mounted transversely of and spaced axially beyond the end of said duct and substantially contiguous to said curved wall surface of said core member, and means for directing a jet of liquid through said one or more apertures of said core member substantially tangentially against said curved surface and thence radially outwardly toward said disk member to spread the liquid in a film moving across said curved surface toward the peripheral edge of said disk member for shearing action of the liquid film by said high velocity air stream.

4. A spray nozzle comprising a tunnel for conducting a stream of air for discharge from an end thereof, a shear plate mounted adjacent the discharge end of said tunnel and having a plane surface disposed normal to the direction of flow of the air stream for impingement thereby, said surface terminating in a shear edge spaced from the wall of said tunnel, and means spaced from said plate and disposed within the periphery of its said shear edge for discharging liquid onto said plate inwardly from its shear edge to form a film of liquid on said plate for flow toward said shear edge for shearing pick-off thereat by said air stream.

5. A shear nozzle comprising a duct for confining a high velocity air stream discharging from a terminal end thereof, a head member mounted coaxially of said duct and in spaced relation to the inner wall surface of said duct, said head member having a concavely flared side surface thereon for impingement by the air stream discharging from said duct, said flared surface terminating in a peripheral shear edge, and means for discharging liquid against the upstream portion of said concavely flared surface for flow in a film thereover toward said shear edge for shearing pickoff thereat by said high velocity air stream.

6. A shear nozzle comprising a duct for discharging a high velocity air blast from a terminal end thereof, an elongated liquid distributing head member spaced from and supported by the inner wall surface of said duct, said head member having a concavely flared side surface for impingement by said air blast, said flared surface merging into a laterally extended straight surface disposed in the path of and substantially normal to the direction of flow of the air blast, said straight head member surface terminating in a peripheral shear edge, and a liquid supply conduit disposed within said head member for discharging liquid onto said concavely flared and straight head member surfaces to flow thereover in a film toward said shear edge for shearing pickoff thereat by said high velocity air blast.

7. A spray nozzle comprising a tube for conducting and discharging a stream of gas from an end thereof, an outwardly divergent base member mounted axially in the discharge end of said tube in spaced relation to the inner wall surface thereof for increasing the velocity of the gas stream passing adjacent thereto, a deflecting head on the outer end of said base member and having a concavely flared surface located in the path of said gas stream for impingement thereby, said base member having a liquid conduit therein for discharging liquid under pressure onto said concavely flared head surface to spread the liquid in a film over said surface, said divergent head surface terminating in a peripheral shearing edge disposed in the path of said gas stream for shearing pickoff of liquid film particles therefrom by said gas stream.

References Cited in the file of this patent

UNITED STATES PATENTS

| Number | Name | Date |
|---|---|---|
| 744,220 | Neu | Nov. 17, 1903 |
| 1,087,768 | Hoffman | Feb. 17, 1914 |
| 1,877,350 | Meachem | Sept. 13, 1932 |
| 1,933,039 | Anderson | Oct. 31, 1933 |
| 2,060,166 | Bowen | Nov. 10, 1936 |
| 2,116,748 | Carter | May 10, 1938 |
| 2,315,096 | Sanderson et al. | Mar. 30, 1943 |
| 2,429,374 | Shade | Oct. 21, 1947 |

FOREIGN PATENTS

| Number | Country | Date |
|---|---|---|
| 376,418 | Great Britain | July 14, 1932 |